(12) United States Patent
Goros

(10) Patent No.: US 7,555,325 B2
(45) Date of Patent: Jun. 30, 2009

(54) PROTECTIVE SLEEVE FOR SMALL PORTABLE ELECTRONIC DEVICES

(76) Inventor: Jean Goros, Rahel-Strauss-Weg 16, 81637 München (DE)

( * ) Notice: Subject to any disclaimer, the term of this patent is extended or adjusted under 35 U.S.C. 154(b) by 588 days.

(21) Appl. No.: 10/917,256

(22) Filed: Aug. 11, 2004

(65) Prior Publication Data

US 2005/0139498 A1   Jun. 30, 2005

Related U.S. Application Data

(63) Continuation of application No. PCT/DE02/04083, filed on Nov. 4, 2002.

(51) Int. Cl.
*H04M 1/00* (2006.01)
(52) U.S. Cl. ............... 455/575.8; 455/575.1; 455/90.3; 455/128
(58) Field of Classification Search ............. 455/550.1, 455/90.3, 90.2, 575.1, 575.8, 575.6, 575.5, 455/128, 347, 348; 206/305, 320, 576
See application file for complete search history.

(56) References Cited

U.S. PATENT DOCUMENTS 5,383,091 A * 1/1995 Snell ..................... 361/679
5,678,204 A * 10/1997 Naylor .................... 455/90.3
6,925,315 B2 * 8/2005 Langford .................. 455/575.1

FOREIGN PATENT DOCUMENTS

| AT | 003 701 U2 | 5/2000 |
|---|---|---|
| DE | 299 22 963 | 4/2000 |
| DE | 200 05 086 | 6/2000 |
| DE | 200 04 630 | 9/2000 |
| DE | 100 65 506 | 7/2001 |
| EP | 0 508 033 | 10/1992 |
| FR | 2 772 223 | 6/1999 |
| GB | 2 312 792 A * | 5/1997 |
| GB | 2 312 792 | 11/1997 |
| WO | WO 92/07372 | 4/1992 |

* cited by examiner

Primary Examiner—John J Lee
(74) Attorney, Agent, or Firm—The Webb Law Firm

(57) ABSTRACT

A protective sleeve for small portable electronic devices, in particular mobile or wireless telephones, is disclosed, comprising at least one strap-like elastic loop, which at least partly surrounds the external circumference of the device when applied to the device. According to the invention, only one loop (2) is provided which is a highly elastic tubular ring, the material, diameter, height and wall thickness of which are arranged such that, when tightly applied to the device, the external circumferential cover of the device is covered and the end edges of the loop are drawn elastically inwards on both front faces (5) of the device and lie thereon in the form of narrow strips (6), forming a frame.

9 Claims, 4 Drawing Sheets

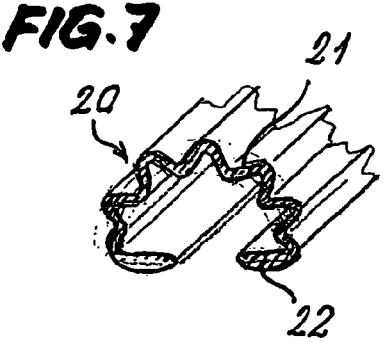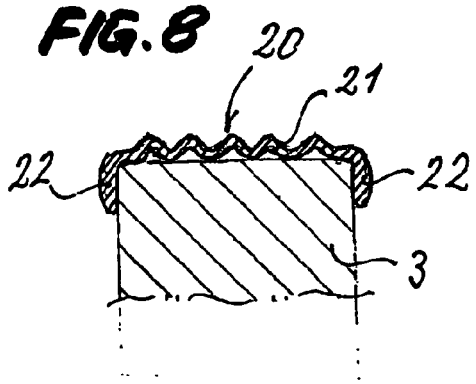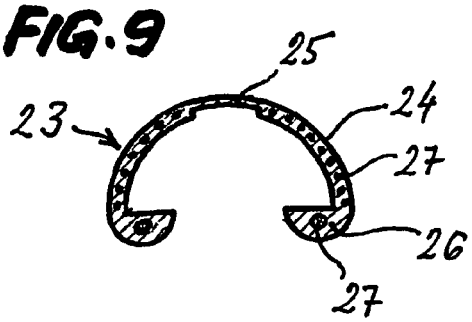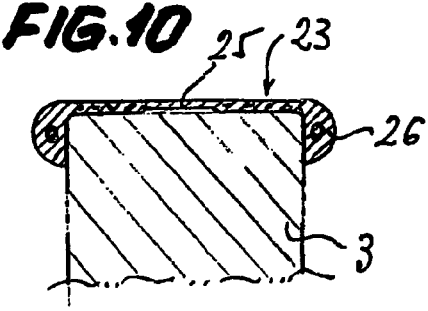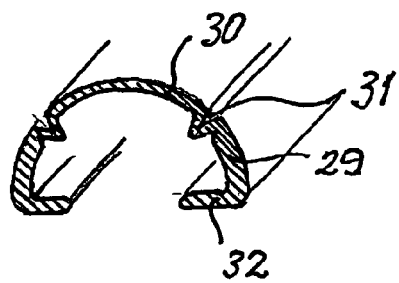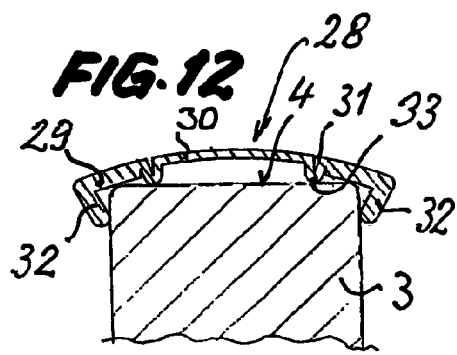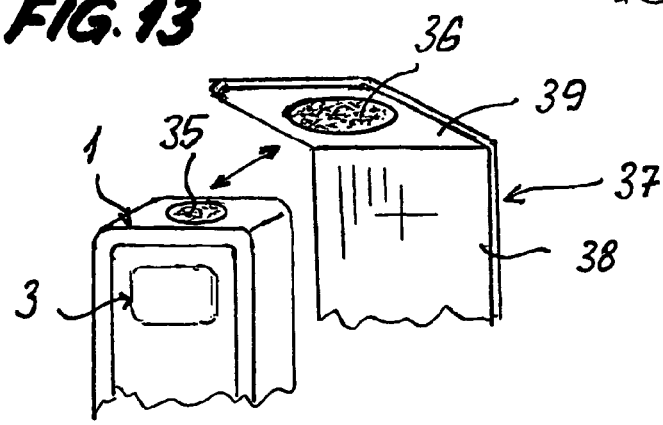

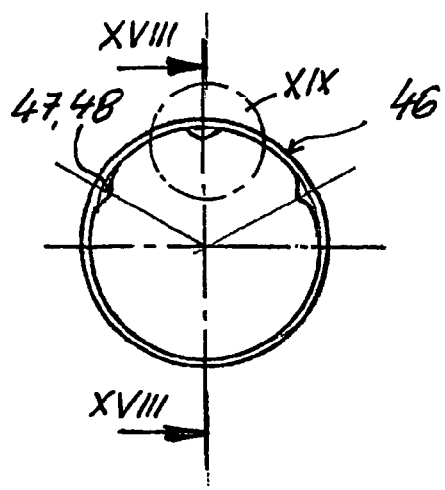
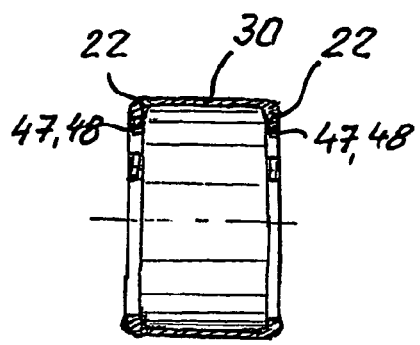
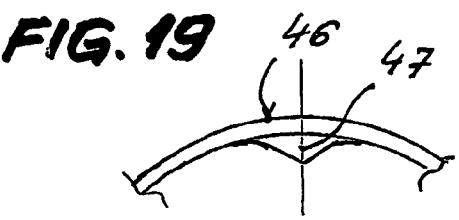
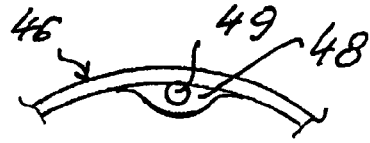
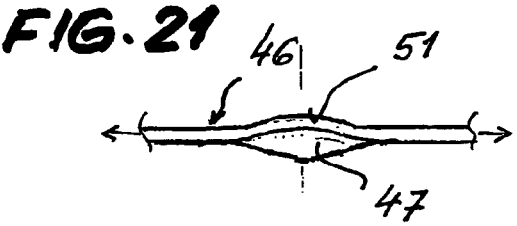
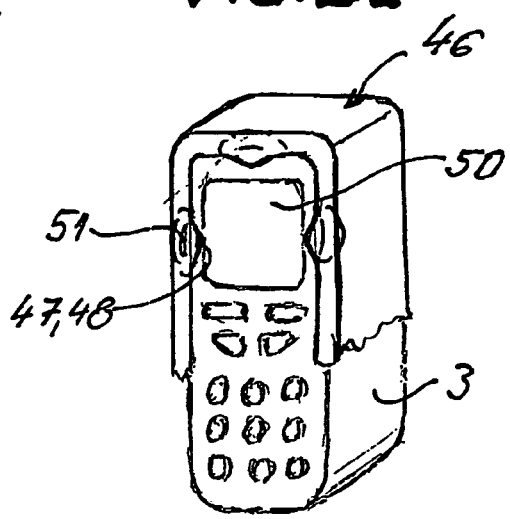

PROTECTIVE SLEEVE FOR SMALL PORTABLE ELECTRONIC DEVICES

This is a continuation of PCT application PCT/DE02/04083, filed Nov. 4, 2002, designating the United States, which claims priority from DE 101 53 419.1 filed Nov. 3, 2001; DE 101 61 477.2 filed Dec. 13, 2001; DE 202 03 580.8 filed Mar. 6, 2002 and DE 20209 610.6 filed Jun. 20, 2002, the disclosures of which are incorporated herein by reference.

DESCRIPTION

The invention relates to a protective sleeve for small portable electronic devices according to the preamble of claim 1, suitable in particular for mobile or cordless telephones, and also for radio and television controllers.

Up to now, so-called mobile phone pouches in which the devices are inserted have been used for mobile telephones as protective sleeves to protect against knocks and jolts and prevent scratching. However, as a rule these are relatively costly since they are complex to manufacture, cover the telephone entirely, restrict operation and are relatively cumbersome when the device is to be carried in tight trouser or coat pockets for example. These mobile phone pouches also do not have an adequate non-slip effect.

A protective sleeve for a mobile radio telephone is known from DE 200 05 086 U1 which is made entirely of an elastic material such as natural rubber for example and surrounds the device on both sides over an upper and a lower cap-shaped area, with the cap parts connected to one another by means of two lateral longitudinal elements. The fact that the cap parts are made relatively deep means that they can also cover essential operating parts such as the microphone and keys, through which function and operation are significantly impaired. In addition, this known protective sleeve is relatively complex to manufacture and has to be produced by injection moulding for example with relatively costly tools.

A protective covering for mobile telephones is also known from DE 100 65 506 A1 and DE 299 22 963 U1 and DE 200 04 630 U1 in which at least two narrow strap-like loops are provided which run across one another with one loop surrounding the external surface of the device, while the at least one further loop is run perpendicular to the first loop and at the same time transversely around the device. Here, the loops are generally designed so as to be narrower than the device so that no edge protection is present per se. In order not to impair the handling of the device, the precise routing of the transverse loop straps has to be adjusted to the type of device, particularly on the front side of the device. In addition, this protective covering is very complicated to manufacture, in particular due to the loop straps running transversely, and consequently relatively costly.

Lastly, protective sleeves are known from EP 0 508 033 B1, AT 003 701 U2 and FR 2 772 223 A1 which are designed as hollow parallelepipeds with at least one rectangular opening at the front for insertion of the device, operation of the keys and as an opening for viewing the display. The internal height of the sleeves produced in rectangular form and the dimensions of their opening edges which are drawn sharply inwards at the front sides of the device are predetermined by the production process. Apart from the fact that larger devices are very difficult to fit into the sleeves, with devices of different sizes the sleeves no longer fit the devices correctly and with smaller devices there is a danger that there is no longer sufficient access for the keypad and display or that these are no longer surrounded sufficiently securely by the sleeve.

Therefore, the object of the invention is to disclose a protective sleeve of the kind named above which is of simple construction, handling and manufacture and at the same time guarantees good protection and in particular a good non-slip effect.

According to the invention, this object is achieved through a protective sleeve of the kind named above with the characterising features of claim 1. Advantageous variants of the protective sleeve are defined in the subordinate claims.

Accordingly, the protective sleeve according to the invention consists of just one circular or oval loop which when fitted on the device surrounds the external circumference of the device so that the outer surface is covered and in addition the edges of the two front faces of the device are surrounded so that the edges of the loops drawn elastically inwards form narrow strips which cover the front faces in the manner of a frame. Thus, the loop exhibits a greater active width than the thickness/height of the device so that when it is fitted around the device it covers the side faces of the device and its side edges projecting beyond the walls of the device fit around the device through the tension in the loop strap after its fitment so that they cover the front sides of the device over a correspondingly narrow zone. Thus, the back and front sides of the device are covered by means of a relatively narrow edge of the strap under the stress of stretching in the manner of a frame. If the device is now put down with either the back side or the front side resting on a surface, the device will not be lying on these housing sides, keys or the display, but is supported by means of the loop frame. However, when the protective sleeve is made of an elastic material which also has a high slip resistance, here there is the great advantage that a device covered with the protective sleeve according to the invention will not slip on an angled and/or smooth surface and thus a major contribution is made towards the safety of the device.

A protective sleeve which can be used in many ways is obtained when the loop is made of a material which can be stretched elastically to at least 300%, such as rubber, caoutchouc, silicone, thermoplastic polyethylene, elastomer, latex or the like, and exhibits a material thickness of approximately 0.4 mm to 2.5 mm, preferably of 0.7 mm. This means that a protective sleeve can be used for portable devices of a wide variety of sizes in optimum fashion. In addition, the minimal wall thickness of the loop of preferably only 0.7 mm makes it possible for the user himself to produce the necessary holes for connections, antennae, etc. or decorative holes in the tube ring later using a simple punching tool which could be supplied in the sales packaging.

When the protective sleeve is produced in the form of a loop which is an elastic tube ring, it is advantageous that this can be manufactured particularly easily and inexpensively. For this form of embodiment can be manufactured very economically in that a tube with the appropriate diameter and appropriate wall thickness is manufactured by extrusion for example in a manner known per se, after which individual tube rings are cut from the tube. With relatively small mobile phones, it is even conceivable to cut a ring of the specified length or width off a bicycle or moped inner tube for example and simply pull it over the mobile phone.

A particularly safe and non-slip, if rather more costly embodiment is obtained if at least one transverse back strap and/or at least one longitudinal back strap are provided on the side of the sleeve loop serving as the back side so that they bear on the back wall of the device under slight tension when the sleeve loop is fitted. Here, the straps can exhibit approximately the same material thickness as the loop or preferably be thinner than the latter in order to provide a secure grip, but without the loop being excessively stressed on the back side or pulled inwards too much at the frame edges. If for example at least one longitudinal and two transverse straps are provided, these form a kind of back lattice or network which overall produces a good grip between the sleeve and the device and good secure contact on the back side of the device.

It can also be highly advantageous if the side of the sleeve loop serving as the back side is provided with a back wall which at least partly closes the latter so that the protective sleeve exhibits the overall form of a cap. Here, the back wall can exhibit a lesser wall thickness than the wall of the loop and thus be more elastic than the latter so that fitting the sleeve onto the device is made easier. If at least one and preferably a plurality of round, oval or polygonal openings are then provided in the back wall, its elasticity is increased even more.

To obtain particularly good elasticity even with a somewhat thicker loop wall, it is advantageous if openings, e.g. in the form of round or oval holes, are provided in the loop in the middle of the circumference. Apart from the fact that these can considerably increase the stretching capacity of the loop, a particular aesthetic effect is also obtained and openings are provided which can be used for passage of the antenna or for access for connecting elements for example.

A further form of embodiment which is aesthetically attractive and also provides increased protection against impacts through the protective sleeve can be obtained if the otherwise smooth cylindrical loop exhibits at least two axially spaced annular projections on its external surface. Knocks can be absorbed easily by the increased thickness of material which is present at least in strips. If then at least two of the annular projections are spaced relative to one another so that when the protective sleeve is fitted on the device they run along the front edges of the device, protruding from these at the same time, this ensures optimum edge protection and in addition the device lies on the corresponding surface in a safer and to a certain degree more cushioned manner due to the frame of the sleeve.

Obviously, the loop provided with projecting rings can be produced using a tube ring as described previously, on the circumference of which projections in the form of cords of semi-circular cross-section for example are glued. However, this method of production is relatively complex. Therefore, it is particularly advantageous if according to the invention such a profiled loop is produced in the form of a strap by the metre by means of an extrusion method known per se for example. After this, lengths of strap corresponding to the length of the circumference of the device are cut from the extruded profiled strap, after which these pieces of strap are closed by means of their ends, e.g. butting or overlapping, by gluing, stitching, at least one press-stud, hook and loop elements, hooks and eyes, magnets or the like to form a circular loop or can be closed accordingly by means of these elements. Here, every possible connecting system can be considered, however in each case it must be remembered that the strap material is relatively elastic and that the visual impression must also be satisfactory.

In one particular form of embodiment, the front ends of the loops produced from profiled straps can each be provided with an annular projection which when the protective sleeve is fitted, cover the device at the front in the form of a narrow projecting frame. Apart from the fact that these annular projections at the ends also make the supporting frames thicker at the front and that the rounded shape also produces a particularly resistant effect visually, this material thickening reduces the elasticity somewhat in this frame area so that it fits snugly on the device. If then in addition the profile is given an overall curved shape with ends pointing radially inwards when it is extruded, the profiled loop is produced with a certain preload which allows optimum contact on the external circumference of the device while just extending on to the front sides thereof. Here, these end strips of the profiled loops extending over the front sides of the device when fitted can be embodied as half round or round projections or angled moulded strips, and when in the form of a projection, can incorporate a cavity in the longitudinal direction into which a shaping wire is or can be laid. The cavity itself increases the cushioning effect of the projections, while a shaping wire laid in the cavity helps to determine the shape of the projection.

It is also advantageous if the protective sleeve loop exhibits increased elasticity or stretching capacity in the transverse direction so as to grip over the front faces of devices of different thickness with sufficient security and width. For this, the profiled loop strap is effectively provided in the transverse direction with at least one expansion pleat in a zigzag, undulating or meandering form for example, or when the loop wall is somewhat thicker, at least one thinner expansion joint is provided in the middle of the circumference. Thus, it is particularly effective if a plurality of undulating or zigzag expansion pleats are provided in a uniform arrangement so that the protective sleeve overall is like a bellows similar to a concertina.

According to the invention, the protective sleeve loop is made of an elastic stretchable material such as rubber, caoutchouc, an elastomer, thermoplastic polyethylene, natural latex or silicone. These materials, interacting with the corresponding profile shaping, guarantee the protective sleeve the high formal flexibility so that one size of sleeve can effectively be used for a plurality of types and sizes of device. Obviously, different visual effects can be achieved through the choice of different materials and the possible colouring of the material. Here, it can be particularly advantageous to use a transparent silicone caoutchouc which in addition can also be printed accordingly so that for example certain inscriptions or patterns can be produced on the internal surface of the strap which are very clearly visible from the outside and in addition cannot be destroyed during use. Then, it is also possible to simply slide a small object or image under the protective sleeve which is then permanently visible.

If the profile of the loop strap is embodied so as to be thick at least in sections so that the stretching capacity is reduced, it is then advantageous if slots are produced in these thicker material sections in the required numbers or even if the cross-section is embodied in the manner of a honeycomb or in the manner of a foam rubber, so that the elasticity of the strap can be increased considerably whilst at the same time ensuring the optimum shock damping capacity.

As already mentioned previously, openings can be provided in the strap. If then at least two of the openings are provided neighbouring one another axially so that the land lying between them can serve as a suspension element for a fastening device such as a hook, carabiner or ring, it is then possible to use this to fasten the device when necessary to a cord, belt etc. for example. To avoid this land tearing, it is advantageous if in addition the land is provided with a reinforcement on the inside, by gluing a transverse strip of solid plastic or metal to the internal surface for example.

In a further form of embodiment according to the invention, the protective sleeve can be at least partly made of hook and loop material. Then it is possible to produce the entire strap of the fleecy hook and loop material with the fleecy side facing outwards, while attaching at least one small piece of the hook and loop material facing inwards at one end so that the hook and loop strap can be overlapped to a greater or lesser degree to match the circumference. The loop of hook and loop material also has the advantage that this can be used to fasten the device to a bracket which in turn is provided with a part of hook and loop material. Here, for example, the loop strap can also be made entirely of elastic material and only be provided with a piece of hook and loop material, preferably the fleecy part of the hook and loop material, on the upper circumferential wall for example, whereas for example the bracket can have a wall which points horizontally and the downward pointing face of which is provided with a second part of hook and loop material. This allows the device to be fastened rapidly and easily by means of its protective sleeve to this bracket hanging on a wall. However, a similar method of fastening can also be obtained by using magnet elements instead of the parts of hook and loop material. Thus, it is advantageous if a magnet part is provided on the upper circumferential wall of the sheath, for example a ferromagnetic plate or strip which can be arranged on the inside of the wall. A correspondingly powerful magnet is then obviously provided on the wall of the bracket to carry the device. It is also conceivable to fasten a corresponding plate-shaped magnet under a table top for example so that the mobile phone is always within easy reach while working without being left lying around in the way on the table top.

Lastly, it is advantageous if at least two curved or triangular nipple extensions exhibiting roughly the same wall thickness as the front projections are provided pointing radially inwards on the front sides of the loop ring provided with the annular projections. As a result of this, the zone in which the nipples are provided becomes less elastic so that when the sleeve is stretched and fitted around the device, a protruding bulge is formed at the front of the annular projection which offers additional protection. A plurality of nipples spaced evenly in relation to one another can be provided on the annular projection. However, it is also possible for example for just three nipples to be arranged around the display of the device, for example one nipple in the middle at the top and one nipple on each side of the display, giving the display particular protection.

In the following, the invention is explained in greater detail on the basis of a plurality of embodiment examples with reference to the drawing in which:

FIG. 7 shows a cross-section with a partial perspective view of a profiled strap in a bellows embodiment with end projections;

FIG. 8 shows the profiled strap according to FIG. 7 when fitted in the form of a loop around a device;

FIG. 9 shows a cross-section of a profiled strap in an embodiment with a central expansion zone and semi-circular end projections;

FIG. 10 shows the profiled strap according to FIG. 9 when fitted in the form of a loop around a device;

FIG. 11 shows a cross-section of a profiled strap in an embodiment with two expansion pleats and inwardly pointing contact strips;

FIG. 12 shows the profiled strap according to FIG. 12 when fitted in the form of a loop around a device;

FIG. 13 shows a partial perspective view of a device with a protective sleeve which is fastened to a bracket with hook and loop material;

FIG. 17 shows a front view of a protective sleeve in the form of an annular loop with nipple extensions;

FIG. 18 shows an axial section XVIII-XVIII through the protective sleeve according to FIG. 17;

FIG. 19 shows a detailed view XIX from FIG. 17, showing a triangular nipple extension;

FIG. 20 shows a detailed view as in FIG. 19, with a curved nipple extension;

FIG. 21 shows the triangular nipple extension as in FIG. 19, but when the protective sleeve is fitted, and FIG. 22 shows a perspective view of a device fitted with a protective sleeve with three nipples in the vicinity of the display of the device.

Figure 1:
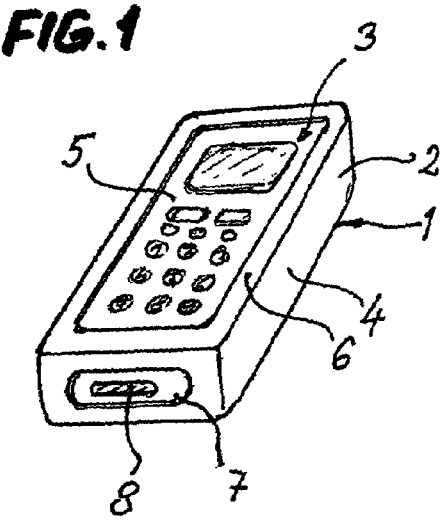
FIG. 1 shows a perspective view of a device with the protective sleeve fitted around it.

As can be seen in FIG. 1, a protective sleeve 1 according to the invention essentially consists of a loop 2 which surrounds the circumference of a telecommunications or control device 3, here clearly a mobile phone. Here, the loop strap is so wide that it completely covers the circumferential wall of the device and also grips around the front wall 5 of the device in the manner of a narrow frame 6. An opening 7 is provided on the lower circumferential side of the sleeve for access for the connecting element 8 of the device.

Figure 2:
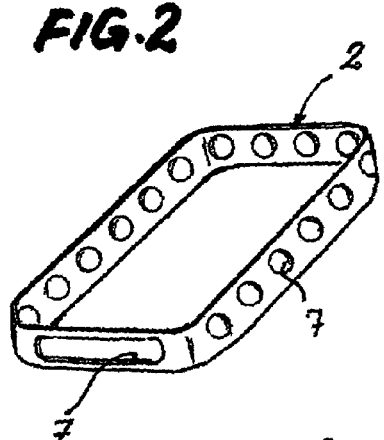
FIG. 2 shows a perspective view of a protective sleeve in loop form in a tube ring embodiment with openings.

FIG. 2 shows that in the illustrated form of embodiment the protective sleeve loop 2 is embodied in the form of a closed strap ring with the opening 7 for the connecting elements provided on one side and unevenly spaced round openings 8 provided over the entire remainder of the surface which help to increase the elasticity of the loop strap.

Figure 3:
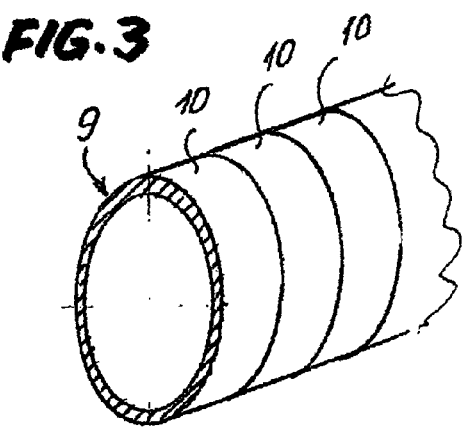
FIG. 3 shows a perspective sectional view of a part of a tube as a semi-product for production of the loops according to FIG. 2.

FIG. 3 shows how the loop 2 is produced from an extruded tube 9 by cutting off or detaching loop rings 10.

Figure 4:
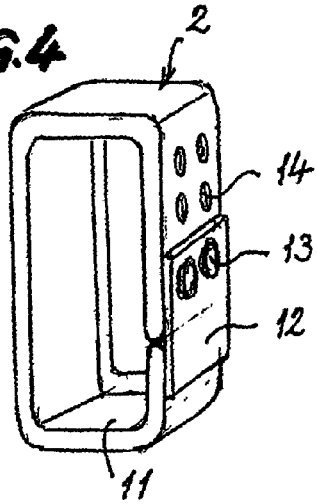
FIG. 4 shows a perspective view of a protective sleeve made of profiled strap with a closing device.

FIG. 4 shows a form of embodiment of the protective sleeve in which the loop 2 is formed of a profiled strap 11 with an essentially U-shaped cross-section. It is clear that this profiled strap, which is produced by extrusion for example, is joined together end to end after cutting to a particular length and held together by means of a connecting strip 12 which is fastened on one side to one end of the profiled strap by gluing for example and on its other side with the aid of press-studs 13 passed through the second end of the profiled strap. A plurality of holes 14 are provided in the second end of the profiled strap so that it is possible to adjust the profiled strap so that it fits more or less tightly with the aid of the strip and the press-studs.

Figure 5:
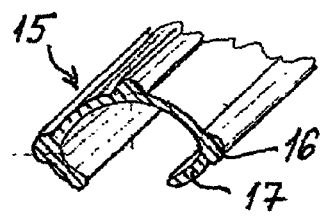
FIG. 5 shows a partial perspective view with a cross-section of a profile strap with a plurality of longitudinal projections.

In the case of the further profiled strap shown in FIG. 5 it is clear that this has an essentially curved shape when unstressed, with longitudinal projections 16 provided on the external wall 3. Here it can be seen that an inwardly pointing end strip 17 is provided as a continuation of the external projections 16.

Figure 6:
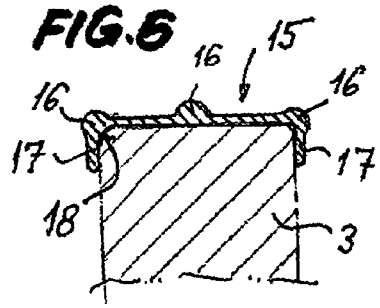
FIG. 6 shows the profiled strap according to FIG. 5 when fitted in the form of a loop around the device.

FIG. 6 shows how the profiled strap 15 according to FIG. 5 fits around the device 3 in the form of a loop and in the process is brought from the originally unstressed curved shape into a U-shape stretched transversely and longitudinally. The projections 16 are embodied and arranged so that the two external projections come to rest over the front edges 18 of the device 3 and provide particular impact protection for these and produce an improved cushioning effect. The end strips 17 of the profile also lie flat on the front sides of the device 3 and form the corresponding frame 6, as can be seen in FIG. 1.

The profiled strap shown in FIG. 7 essentially exhibits the shape of a zigzag bellows 21 and is provided with an end projection 22 at the edges of the strap in each case.

FIG. 8 shows how the bellows 21 is fitted over the external surface wall of the device 3 while the end projections fit around the front sides of the device 3.

The profiled strap 23 shown in FIG. 9 essentially exhibits a semi-circular shape the wall 24 of which has a thinner expansion zone 25 in the middle, while longitudinal projections 26 with a semi-circular cross-section are provided at the ends or sides of the strap. Each of these longitudinal projections incorporates a longitudinal cavity 27 into which a shaping wire or a cord can be inserted. Further openings 27 can be provided in the walls 24.

FIG. 10 shows how the profile 23 according to FIG. 9 is stretched flat when fitted in the form of a loop on the device 3, while the end projections 26 grip around the front faces of the device and can also serve as cushions.

When relaxed, the profiled strap 28 illustrated in FIG. 11 is essentially also semi-circular in shape, with two opposing thicker wall parts 29 between which there is a thinner and more elastic wall part 30 which is connected to the thicker wall part 29 through an expansion pleat 31 in each case, through which the elasticity is increased substantially. A strip 32 pointing radially is provided on each of the outer sides of the wall parts 29.

FIG. 12 shows how the profiled strap 28, when fitted in the form of a loop around the device 3, is expanded into what is now only a very slight curved shape, with the strap with the strips 32 embracing the front sides of the device 3. At the same time, the strap is supported in the direction of the circumferential wall 4 of the device 3 by means of the humps 33 of the expansion pleats 31 so that the central wall part 30 stands over the wall of the device like an elastic bridge, producing an additional cushioning effect.

FIG. 13 shows a device 3 with a protective sleeve 1, similar to FIG. 1, but here a part 35 of hook and loop material is arranged on the upper side of the protective sleeve. This co-operates with a further part 36 of hook and loop material on a bracket 37 which consists of a vertical fastening wall 38 and a horizontal holding wall 39 which carries the part 36 of hook and loop material. Instead of the parts 35, 36 of hook and loop material, corresponding magnet parts can be provided, i.e. either two magnets with opposite polarity or one magnet in the holding wall for example and a ferromagnetic part in the protective sleeve.

Figure 14:
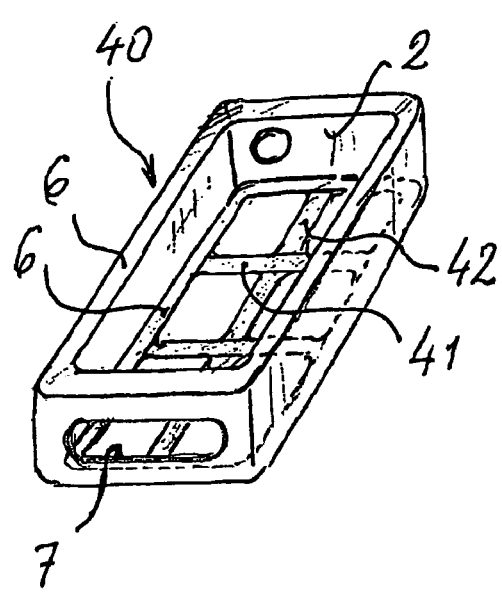
FIG. 14 shows a perspective view of a protective sleeve in an embodiment with back straps.

The form of embodiment illustrated in FIG. 14 is a protective sleeve as in FIG. 1, shown as if it is stretched around a device (not shown). Here, the edges of the loop in each case grip around the device at the front and rear forming a narrow frame 6, with two transverse back straps 41 and one longitudinal back strap 42 connecting the opposing back edges 6 in the manner of a net at the rear.

Figure 15:
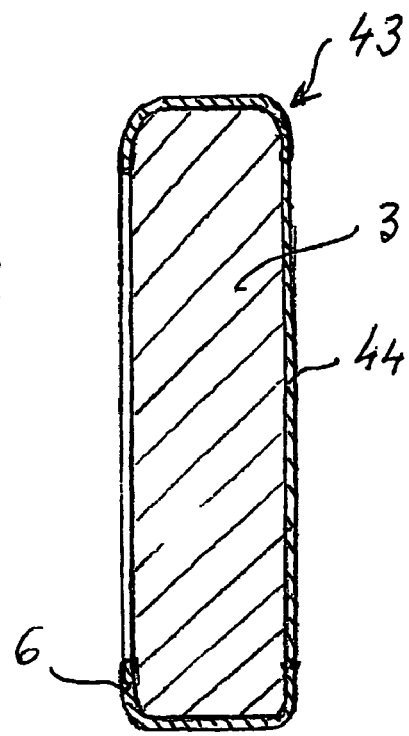
FIG. 15 shows a longitudinal section through a protective sleeve with a back wall fitted on a device.
Figure 16:
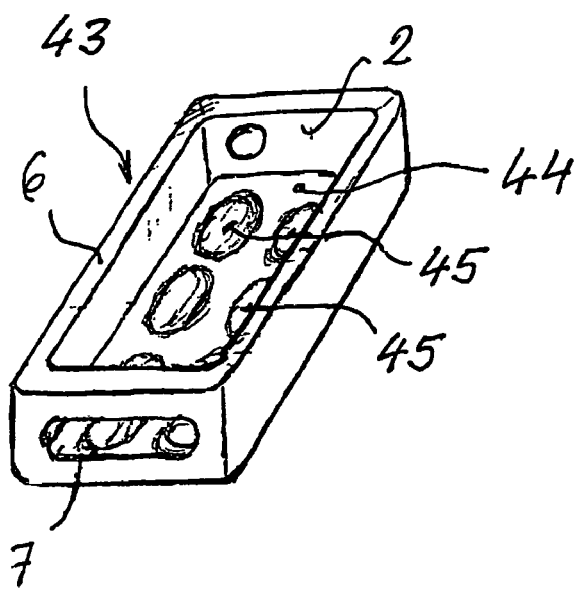
FIG. 16 shows a perspective view of a protective sleeve according to FIG. 15 with openings in the back wall.

FIGS. 15 and 16 show a protective sleeve 43 which is closed by means of a back wall 44 at the rear. This sleeve 43 is pulled over or onto the device like a cap or shoe so that the front edge forms a frame 6 enclosing the front of the device at the same time, while the back wall 44 bears on the device at the rear. The elasticity of the back wall is increased, with a good holding and non-slip effect, by the openings 45 which can be seen in the back wall 44 in FIG. 16 and are shown as round or oval and can have any other shape and any other alignment, for example take the form of oval slots aligned longitudinally, transversely or obliquely or diagonally.

FIGS. 17 and 18 show a protective sleeve 46 which is made in one piece in the form of an annular loop by injection moulding for example. It exhibits a central, relatively thin, highly elastic annular wall part 30 whose two front sides are in each case provided with a thicker end projection 22 pointing radially inwards. Again, these end projections 22 are provided with nipple extensions 47, 48 which point radially and have roughly the same material thickness as the end projections 22. In the embodiment example shown, three nipple extensions 47 are provided which are arranged symmetrically in relation to the display 50 of the device 3 when the protective sleeve is fitted on a device 3 (also see FIG. 22).

FIG. 19 shows a detail of the relaxed protective sleeve 47 with a triangular nipple extension 47, whereas FIG. 20 shows a curved nipple extension 48 which also has a hole 49 for attachment of a transverse strap for example, preferably on the back side of the device.

FIG. 21 shows the portion of the protective sleeve 46 in FIG. 19, but when stretched. The fact that the nipple extension 47 is also thicker than the central wall part 30 means that this section is less elastic and has a hump-shaped protrusion 51 at the front which offers additional protection.

Lastly, FIG. 22 shows the protective sleeve 46 when stretched on a device 3. Here, the three nipples shown in FIG. 17 are arranged so that they surround the display 50 on three sides and provide additional protection for this in particular through their protrusions 51.

LIST OF REFERENCES

1. Protective sleeve
2. Loop
3. Device
4. Circumferential wall
5. Front face
6. Frame
7. Opening
8. Connecting element
9. Tube
10. Loop ring
11. Profiled strap
12. Connecting strip
13. Press stud
14. Holes
15. Profiled strap
16. Longitudinal projection
17. End strip
18. Edges
19. —
20. Profiled strap
21. Bellows
22. End projection
23. Profiled strap
24. Wall
25. Expansion zone
26. Longitudinal projections
27. Cavity
28. Profiled strap
29. Wall part
30. Wall part
31. Expansion pleat
32. Strip
33. Hump
34. —
35. Part of hook and loop material
36. Part of hook and loop material
37. Bracket 38. Wall
39. Wall
40. Protective sleeve (back straps)
41. Transverse back straps
42. Longitudinal back straps
43. Protective sleeve (back wall)
44. Back wall
45. Openings
46. Protective sleeve (nipple)
47. Triangular nipple extension
48. Curved nipple extension
49. Hole
50. Display
51. Protruding hump

What is claimed is:

1. A protective sleeve for small portable electronic devices comprising at least one loop that when fitted on the device at least partly surrounds external surfaces of the device and encloses at least the external circumference of the device, wherein the loop is an elastic tube ring, wherein the material, diameter, height and wall thickness thereof are sized such that an external circumferential surface of the device is covered and when the loop is fitted taut on the external surfaces of the device, end edges of the loop on a front face of the device are drawn elastically inwards over front and back edges of the device and rest on the front faces in the form of narrow strips to frame the device, wherein the tube ring is constructed of material selected from one of rubber, caoutchouc, silicone, thermoplastic polyethylene, elastomer, and latex, wherein the material is stretchable at least 300%, and wherein the tube ring is approximately 0.4 mm to 2.5 mm in thickness.

2. The protective sleeve according to claim 1, wherein the tube ring on an external surface thereof includes at least two annular projections axially spaced in relation to one another such that when the protective sleeve is fitted on the device, the two annular projections extend along the front edges of the device and protrude pointing away therefrom.

3. The protective sleeve according to claim 2, further comprising at least two curved or triangular nipple extensions pointing radially inwards on annular projections, wherein the at least two curved or triangular nipple extensions have substantially the same wall thickness as the annular projections, wherein the projections are substantially symmetrically arranged on the external surface of the loop that corresponds to the area around a display of the device when the loop is fitted on the device.

4. The protective sleeve according to claim 3, further comprising a third curved or triangular nipple extension arranged on the external surface of the loop that corresponds to a middle upper area around the display of the device when the loop is fifed on the device.

5. The protective sleeve according to claim 1, wherein front ends of the loop include a respective annular projection, wherein the annular projections are one of round, half-round, and angled strips, wherein when the protective sleeves is not fitted onto the device, an axial cross-section of the protective sleeve is essentially curved, with annular projections projecting radially inwards.

6. The protective sleeve according to claim 1, wherein in an axial direction of the loop includes a plurality of expansion pleats is included that is shaped in one of a zigzag, undulating, and meandering uniform arrangement forming a bellows.

7. The protective sleeve according to claim 1, wherein the loop is a strap whose length corresponds to the circumferential length of the device, wherein ends of the strap are attachable to and detachable from each other by one of gluing, stitching, at least one press-stud, hook and loop fasteners, hook and eye fasteners, and magnets.

8. The protective sleeve according to claim 1, further comprising at least two openings neighboring one another axially in the circumference of the loop so that the area defined between them is sized to receive a fastening device selected from one of a hook and carabiner, wherein the area includes a reinforcement on an inner side thereof to prevent the fastening device from being torn out.

9. The protective sleeve according to claim 1, wherein the loop comprises one of corresponding magnets and hook and loop material situated in an area on an external surface of the loop that corresponds to the area along a top of the device when the loop is fitted on the device.

* * * * *

UNITED STATES PATENT AND TRADEMARK OFFICE
CERTIFICATE OF CORRECTION

| | | |
|---|---|---|
| PATENT NO. | : 7,555,325 B2 | Page 1 of 1 |
| APPLICATION NO. | : 10/917256 | |
| DATED | : June 30, 2009 | |
| INVENTOR(S) | : Goros | |

It is certified that error appears in the above-identified patent and that said Letters Patent is hereby corrected as shown below:

Title of the Patent: Add the following:

Item -- (30)  Foreign Application Priority Data

Nov. 3, 2001   (DE) ......................... 101 53 419.1
Dec. 13, 2001  (DE) ......................... 101 61 477.2
Mar. 6, 2002   (DE) ......................... 202 03 580.8
Jun. 20, 2002  (DE) ......................... 202 09 610.6 --

Title of the Patent: See Item (56) References Cited, U.S. PATENT DOCUMENTS, add the following reference:

-- 6,634,494   10/2003       Derr et al. .............206/305 --

Column 10, Line 10, Claim 4, "fifed on the device" should read -- fitted on the device --

Signed and Sealed this

Seventeenth Day of November, 2009

David J. Kappos
*Director of the United States Patent and Trademark Office*